United States Patent
Li et al.

(10) Patent No.: US 11,555,497 B2
(45) Date of Patent: Jan. 17, 2023

(54) QUICK STARTUP DEVICE FOR CENTRIFUGAL PUMP

(71) Applicant: Jiangsu University, Jiangsu (CN)

(72) Inventors: Xiaowei Li, Jiangsu (CN); Hao Chang, Jiangsu (CN); Guangjie Peng, Jiangsu (CN); Shiming Hong, Jiangsu (CN); Weidong Shi, Jiangsu (CN)

(73) Assignee: Jiangsu University, Jiangsu (CN)

( * ) Notice: Subject to any disclaimer, the term of this patent is extended or adjusted under 35 U.S.C. 154(b) by 0 days.

(21) Appl. No.: 17/680,327

(22) Filed: Feb. 25, 2022

(65) Prior Publication Data

US 2022/0325716 A1    Oct. 13, 2022

(51) Int. Cl.

| | |
|---|---|
| *F04D 9/02* | (2006.01) |
| *F04D 9/04* | (2006.01) |
| *F04D 29/66* | (2006.01) |
| *F04D 15/00* | (2006.01) |
| *F04D 9/00* | (2006.01) |
| *F04C 2/356* | (2006.01) |
| *B01D 19/00* | (2006.01) |
| *F04D 13/06* | (2006.01) |

(52) U.S. Cl.
CPC ........... *F04D 9/02* (2013.01); *B01D 19/0052* (2013.01); *F04C 2/3566* (2013.01); *F04D 9/005* (2013.01); *F04D 9/006* (2013.01); *F04D 9/04* (2013.01); *F04D 9/041* (2013.01); *F04D 15/0083* (2013.01); *F04D 29/669* (2013.01); *F04D 13/06* (2013.01)

(58) Field of Classification Search
CPC . F04D 9/02; F04D 9/005; F04D 9/006; F04D 9/04; F04D 9/041; F04D 15/0083; F04D 29/669; B01D 19/0052; F04C 2/3566
See application file for complete search history.

(56) References Cited

U.S. PATENT DOCUMENTS

2022/0120280 A1*    4/2022    Li ............................ F04D 1/00

* cited by examiner

*Primary Examiner* — Peter J Bertheaud
(74) *Attorney, Agent, or Firm* — JCIPRNET

(57) ABSTRACT

The present invention provides a quick startup device for a centrifugal pump. The device includes an upper self-priming chamber, a lower self-priming chamber, and an inlet pipe sequentially arranged from top to bottom. The upper self-priming chamber and the lower self-priming chamber are integrally mounted on the inlet pipe. A main shaft and a hexagonal partition member rotatably mounted on the main shaft are arranged on an axis of the upper self-priming chamber. A blade tip of each partition plate is closely attached to an inner wall surface of the upper self-priming chamber. Three identical accommodation grooves are provided on an inner side of the upper self-priming chamber. A spring and a separation baffle are arranged in each accommodation groove, an exhaust hole is provided on one side of each accommodation groove, and an air intake pipe is provided on the other side of each accommodation groove.

10 Claims, 1 Drawing Sheet

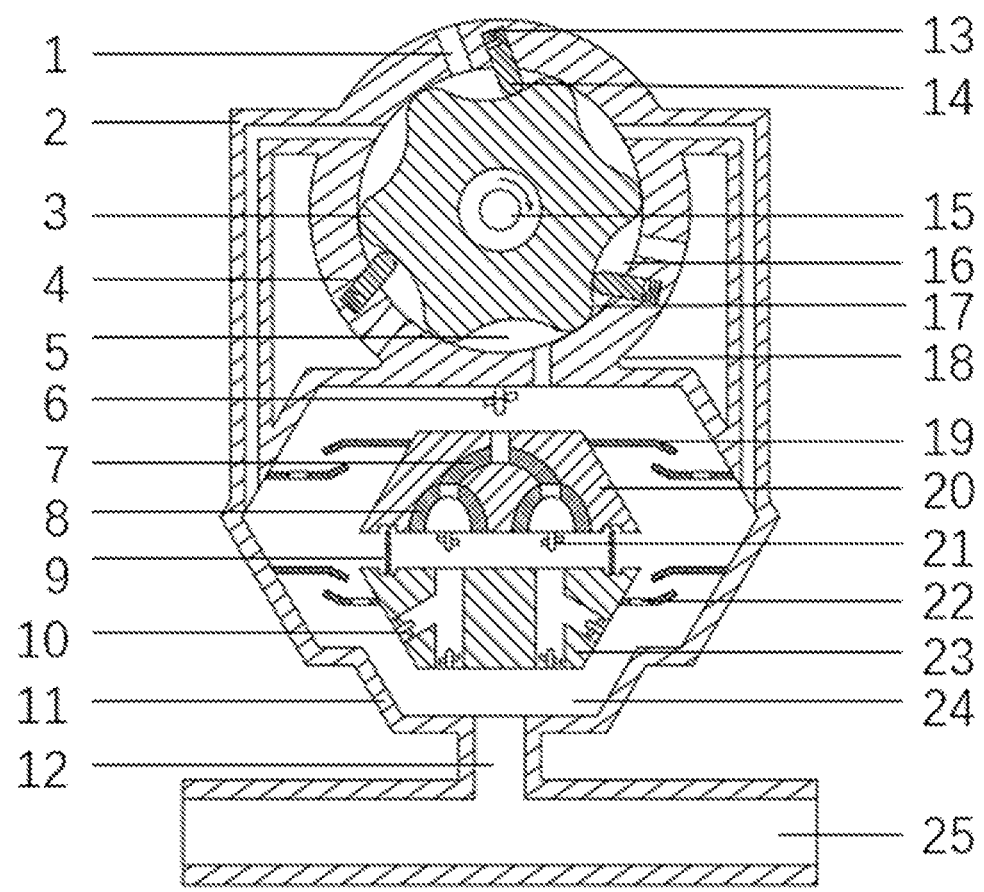

QUICK STARTUP DEVICE FOR CENTRIFUGAL PUMP

CROSS-REFERENCE TO RELATED APPLICATION

This application claims the priority benefit of China application serial no. 202110395826.2, filed on Apr. 13, 2021. The entirety of the above-mentioned patent application is hereby incorporated by reference herein and made a part of this specification.

TECHNICAL FIELD

The present invention relates to the technical field of centrifugal pumps, and in particular, to a quick startup device for a centrifugal pump.

BACKGROUND

Centrifugal pumps are widely used in agricultural irrigation, fire rescue, and other fields. However, once a centrifugal pump is started, air needs to be expelled from the pump and pipes first. Since bearing assemblies and other components dissipate heat during idle operation of the pump, long-term idle operation will reduce the service life of the pump and damage the parts of the pump. Therefore, the centrifugal pump generally requires priming, which greatly prolongs the startup time and seriously affects the working efficiency of the pump. An external auxiliary vacuum pump not only produces a lot of noises, but also makes it difficult to transport the whole machine, thereby reducing the overall mobility, and at least two motors need to be equipped, which increases the energy consumption.

SUMMARY

To eliminate the defects in the prior art, the present invention provides a quick startup device for a centrifugal pump. The startup device, driven by only one motor, produces small noises and is simple to operate and convenient to transport. The device enables startup without priming. It can quickly complete air intake and exhaust processes through its own structure and block a pump inlet pipe after the operation ends, so that the device is filled with water all the time and directly enters a normal operating condition when it is restarted, thereby achieving high working efficiency and low energy loss.

The present invention achieves the above objective through the following technical means.

The present invention provides a quick startup device for a centrifugal pump. The device includes an upper self-priming chamber, a lower self-priming chamber, and an inlet pipe sequentially arranged from top to bottom, wherein the upper self-priming chamber, the lower self-priming chamber, and the inlet pipe are hollow cylindrical; the upper self-priming chamber and the lower self-priming chamber are mounted on the inlet pipe, an upper self-priming cavity is arranged in the upper self-priming chamber, a lower self-priming cavity is arranged in the lower self-priming chamber, and the lower self-priming chamber is connected to the inlet pipe via a communicating pipe;

a main shaft and a hexagonal partition member rotatably mounted on the main shaft are arranged on an axis of the upper self-priming chamber, and the main shaft is driven by a motor; the hexagonal partition member is regular hexagonal and includes six identical partition plates, every two of the partition plates form an angle of 60°, a blade tip of each of the partition plates has a circular cross-section, every two of the blade tips are connected by a circular arc to achieve a smooth transition, and the blade tip of each of the partition plates is closely attached to an inner wall surface of the upper self-priming chamber;

three identical accommodation grooves are provided on an inner side of the upper self-priming chamber, and the accommodation grooves are arranged in tangential directions of the upper self-priming chamber; the accommodation grooves are embedded in the upper self-priming chamber and are in communication with the upper self-priming cavity; every two of the accommodation grooves form an angle of 120°;

a compression spring and a separation baffle are arranged in each of the accommodation grooves, wherein one end of the compression spring is connected to a bottom of the accommodation groove, the other end of the compression spring is connected to one end of the separation baffle, and the other end of the separation baffle abuts against an outer wall surface of the hexagonal partition member;

an exhaust hole is provided on one side of each of the accommodation grooves, and an air intake pipe is provided on the other side of each of the accommodation grooves; the exhaust holes are arranged in radial directions of the upper self-priming chamber, the air intake pipes are arranged in tangential directions of the upper self-priming chamber, the exhaust holes and the air intake pipes are uniformly distributed along a circumference of the upper self-priming chamber, the exhaust holes are in communication with an atmosphere, and the air intake pipes communicate the upper self-priming cavity with the lower self-priming cavity;

the exhaust hole and the air intake pipe on the two sides of each of the accommodation grooves are located between two of the partition plates on the hexagonal partition member, respectively; the hexagonal partition member divides the upper self-priming cavity into six independent parts, and each of the three parts not adjacent to one another is divided by the separation baffle into two smaller parts, namely, an exhaust cavity and an air intake cavity; the exhaust cavities are in communication with the exhaust holes, respectively and the air intake cavities are in communication with the air intake pipes, respectively;

an upper check valve and a lower check valve are arranged in the lower self-priming chamber, and the upper check valve and the lower check valve are connected via connecting springs; a third-stage blade is arranged on top of the upper check valve; a rubber disc is arranged on an outer side of the upper check valve and return holes are provided on the rubber disc; two second-stage blades are arranged on a bottom of the upper check valve, a first-stage spiral separator is arranged above each of the second-stage blades, and a second-stage spiral separator is arranged above the first-stage spiral separators; a rubber disc is arranged on an outer side of the lower check valve; and first-stage blades are arranged on a bottom and a side surface of the lower check valve.

Further, the other end of the separation baffle is semicircular; a ratio of a circle radius of the blade tip of the hexagonal partition member to a radius of curvature of the outer wall surface of the hexagonal partition member to a semicircle radius of the other end of the separation baffle is 3:9:1.

Further, the first-stage spiral separators and the second-stage spiral separator have identical structures;

each of the first-stage spiral separators includes a semi-elliptical bend pipe and spiral cutting blades arranged on an inner surface of the bend pipe, wherein the bend pipe has a semi-elliptical structure with a ratio of a major axis to a minor axis being 4:3, and the spiral cutting blades on left and right sides of the first-stage spiral separator rotate in opposite directions.

Further, the two second-stage blades rotate in opposite directions;

the first-stage blades on the bottom of the lower check valve and the first-stage blades on the side surface of the lower check valve rotate in opposite directions, and the first-stage blades on the bottom of the lower check valve and the first-stage blades on the side surface of the lower check valve form an axial angle of 45°.

Further, the lower check valve has a circular cross-section;

a bottom surface of the lower check valve is closely attached to an inner wall of a bottom side of the lower self-priming chamber to block the communicating pipe.

Further, the bottom surface and the side surface of the lower check valve form an angle of 120°.

Further, the side surface of the lower check valve and a side surface at a bottom of the lower self-priming chamber are in clearance fit.

Further, a ratio of a depth of the accommodation groove to a height of the separation baffle is 1.2:1.

Further, a ratio of a diameter of the inner wall of the upper self-priming chamber to a diameter of an inner wall of the lower self-priming chamber is 2:3.

Further, the first-stage spiral separators, the second-stage spiral separator, the first-stage blades, the third-stage blade, and the second-stage blades are made of aluminum alloy materials;

the upper self-priming chamber, the lower self-priming chamber, the inlet pipe, the air intake pipes, and the accommodation grooves are integrally formed by cast iron;

the hexagonal partition member, the separation baffles, the upper check valve, and the lower check valve are formed by rubber materials;

the compression springs are made of graphene materials.

The present invention has the following beneficial effects:

1. The present invention adopts the hexagonal partition member and the separation baffles to realize volume adjustment of the air intake cavities and the exhaust cavities, so that an air intake and exhaust process is completed every time each partition plate of the hexagonal partition member rotates by 120°, and air intake and exhaust are carried out in sync. That is, a self-priming process is completed for eighteen times while the six partition plates rotate by a circle, which greatly improves the self-priming efficiency and significantly reduces the self-priming time. Besides, the hexagonal partition member is made of rubber materials, which effectively avoids damages caused by cavitation to the rotating parts and ensures the stable operation of the pump.

2. The present invention adopts the check valve structures, which can move vertically in the lower self-priming chamber during the self-priming process, thereby reducing the resistance loss of the inflow in the communication pipe, and can fall back to the bottom of the lower self-priming chamber after the self-priming is completed, thereby blocking the communicating pipe. The damage caused by water hammer when the device is shut down can be effectively reduced, and the lower self-priming chamber is filled with liquid, so that the device can directly enter a normal operating condition when it is restarted, which significantly improves the working efficiency.

3. The present invention adopts spiral separator structures. In the middle stage of self-priming, gas-liquid cutting can be carried out on the high-speed gas-liquid two-phase flow by using the spiral cutting blades of the spiral separators to complete gas-liquid separation. Meanwhile, the two-phase flows rotating in opposite directions collide at the intersections of the spiral separators to cause impact crushing and result in further gas-liquid separation. After that, the water falls back into the lower self-priming chamber. Through several times of gas-liquid separation, the liquid-phase displacement during the self-priming process is reduced and the air discharge from the pump is accelerated.

4. The present invention adopts the two-layer self-priming structure including the upper self-priming chamber and the lower self-priming chamber, the separation baffles and the hexagonal partition member further ingeniously divide the upper self-priming cavity into three air intake cavities and three exhaust cavities, the exhaust holes are in communication with the exhaust cavities, and the air intake cavities are in communication with the air intake pipes, which realizes connection between different self-priming chambers. By using the sealing performance of the check valves, no auxiliary motor is needed and the centrifugal pump can be started without priming, thereby avoiding the complicated operation of priming before startup of a centrifugal pump in the prior art.

BRIEF DESCRIPTION OF THE DRAWINGS

FIGURE is a schematic structural diagram of a quick startup device for a centrifugal pump according to the present invention.

DETAILED DESCRIPTION OF THE EMBODIMENTS

The present invention is further described below with reference to the accompanying drawings and specific embodiments, but the protection scope of the present invention is not limited thereto.

As shown in FIGURE, the quick startup device for the centrifugal pump according to the present invention includes an upper self-priming chamber 18, a lower self-priming chamber 11, and an inlet pipe 25 sequentially arranged from top to bottom. The upper self-priming chamber 18, the lower self-priming chamber 11, and the inlet pipe 25 are hollow cylindrical. Optionally, a ratio of a diameter of an inner wall of the upper self-priming chamber to a diameter of an inner wall of the lower self-priming chamber is 2:3. The upper self-priming chamber 18 and the lower self-priming chamber 11 are mounted on the inlet pipe 25. An upper self-priming cavity 5 is arranged in the upper self-priming chamber 18. A lower self-priming cavity 24 is arranged in the lower self-priming chamber 11. The lower self-priming chamber 11 is connected to the inlet pipe 25 via a communicating pipe 12.

A main shaft 15 and a hexagonal partition member 3 rotatably mounted on the main shaft 15 are arranged on an axis of the upper self-priming chamber 18. The main shaft 15 is driven by a motor. The hexagonal partition member 3 is regular hexagonal and includes six identical partition plates. Every two of the partition plates form an angle of 60°. A blade tip of each of the partition plates has a circular cross-section. Every two of the blade tips are connected by a circular arc to achieve a smooth transition. The blade tip of each of the partition plates is closely attached to the inner wall surface of the upper self-priming chamber 18.

Three identical accommodation grooves 4 are provided on the inner side of the upper self-priming chamber 18. The accommodation grooves 4 are arranged in tangential directions of the upper self-priming chamber 18. The accommodation grooves 4 are embedded in the upper self-priming chamber 18 and are in communication with the upper self-priming cavity 5. Every two of the accommodation grooves 4 form an angle of 120°. A compression spring 13 and a separation baffle 14 are arranged in each of the accommodation grooves 4, wherein one end of the compression spring 13 is connected to the bottom of the accommodation groove 4, the other end of the compression spring 13 is connected to one end of the separation baffle 14, and the other end of the separation baffle 14 is semicircular and abuts against an outer wall surface of the hexagonal partition member 3. In an initial state, the compression springs 13 are compressed and the other end of each of the separation baffles 14 abuts against a position between two of the partition plates of the hexagonal partition member 3. When the hexagonal partition member 3 rotates and the blade tips of the hexagonal partition member 3 contact the other ends of the separation baffles 14, the separation baffles 14 are completely received into the accommodation grooves 4, respectively. Optionally, a ratio of a depth of the accommodation groove 4 to a height of the separation baffle 14 is 1.2:1, and a ratio of a circle radius of the blade tip of the hexagonal partition member 3 to a radius of curvature of the outer wall surface of the hexagonal partition member 3 to a semicircle radius of the other end of the separation baffle 14 is 3:9:1.

An exhaust hole 1 is provided on one side of each of the accommodation grooves 4, and an air intake pipe 2 is provided on the other side of each of the accommodation grooves 4. The exhaust holes 1 are arranged in radial directions of the upper self-priming chamber 18, the air intake pipes 2 are arranged in tangential directions of the upper self-priming chamber 18, and the exhaust holes 1 and the air intake pipes 2 are uniformly distributed along the circumference of the upper self-priming chamber 18. The exhaust holes 1 are in communication with the atmosphere. The air intake pipes 2 communicate the upper self-priming cavity 5 with the lower self-priming cavity 24.

The exhaust hole 1 and the air intake pipe 2 on the two sides of each of the accommodation grooves 4 are located between two of the partition plates on the hexagonal partition member 3, respectively. The hexagonal partition member 3 divides the upper self-priming cavity 5 into six independent parts, and each of the three parts not adjacent to one another is divided by the separation baffle 14 into two smaller parts, namely, an exhaust cavity 16 and an air intake cavity 17. The exhaust cavities 16 are in communication with the exhaust holes 1, respectively. The air intake cavities 17 are in communication with the air intake pipes 2, respectively.

An upper check valve 20 and a lower check valve 23 are arranged in the lower self-priming chamber 11. The upper check valve 20 and the lower check valve 23 are connected via connecting springs 9. A third-stage blade 6 is arranged on top of the upper check valve 20. A rubber disc 19 is arranged on an outer side of the upper check valve 20, and in the initial state, the rubber disc 19 is attached to a rubber disc 19 arranged on an upper portion of the inner wall of the lower self-priming chamber 11. Return holes 22 are provided on the rubber disc 19 on the upper portion of the inner wall of the lower self-priming chamber 11. Second-stage blades 21 are arranged on the bottom of the upper check valve 20, and the second-stage blades 21 on the left and right sides rotate in opposite directions. A first-stage spiral separator 8 is arranged above each of the second-stage blades 21. Optionally, the first-stage spiral separator 8 is designed into a semi-elliptical bend pipe with a ratio of a major axis to a minor axis being 4:3. Spiral cutting blades are arranged on an inner surface of the bend pipe, and the spiral cutting blades on the left and right sides of the first-stage spiral separator 8 rotate in opposite directions. A second-stage spiral separator 7 is arranged above the first-stage spiral separators 8. The second-stage spiral separator 7 is also designed into a semi-elliptical bend pipe with a ratio of a major axis to a minor axis being 4:3. Spiral cutting blades are arranged on an inner surface of the bend pipe, and the spiral cutting blades on the left and right sides of the second-stage spiral separator 7 rotate in opposite directions. A rubber disc 19 is arranged on an outer side of the lower check valve 23, and in the initial state, the rubber disc 19 is attached to a rubber disc 19 arranged on a lower portion of the inner wall of the lower self-priming chamber 11. Return holes 22 are provided on the rubber disc 19 on the lower portion of the inner wall of the lower self-priming chamber 11. First-stage blades 10 are arranged on the bottom and the side surface of the lower check valve 23. The first-stage blades 10 on the bottom of the lower check valve 23 and the first-stage blades 10 on the side surface of the lower check valve 23 rotate in opposite directions and form an axial angle of 45°. In the initial state, the lower check valve 23 blocks the communicating pipe 12.

Optionally, the bottom surface and the side surface of the lower check valve 23 form an obtuse angle which is specifically 120° and are in clearance fit.

Optionally, the first-stage spiral separators 8, the second-stage spiral separator 7, the first-stage blades 10, the second-stage blades 21, and the third-stage blade 6 are made of aluminum alloy materials. The upper self-priming chamber 18, the lower self-priming chamber 11, the inlet pipe 25, the air intake pipes 2, and the accommodation grooves 4 are integrally formed by cast iron. The hexagonal partition member 3, the separation baffles 14, the upper check valve 20, and the lower check valve 23 are formed by rubber materials. The compression springs 13 are made of graphene materials.

The working process of the present invention is as follows:

The motor drives the main shaft 15 to rotate, so that the hexagonal partition member 3 rotates clockwise. With the rotation of the hexagonal partition member 3, the separation baffles 14 can only be received into the accommodation grooves 4 in the tangential directions, and the compression deformation of the compression springs 13 in the accommodation grooves 4 gradually increases. The volume of the air intake cavities 17 connected to the air intake pipes 2 increases and the pressure in the air intake cavities 17 gradually drops. Therefore, the air in the lower self-priming cavity 24 enters the air intake cavities 17 via the air intake pipes 2, and the air in the lower self-priming cavity 24 becomes less. Meanwhile, the lower self-priming cavity 24 is in communication with the inlet pipe 25 via the communicating pipe 12, the lower check valve 23 is mounted above the communicating pipe 12, and in the initial state, the lower surface of the lower check valve 23 is attached to the bottom of the lower self-priming chamber 11 and the communicating pipe 12 is blocked, forming in the device a closed space where air can only be discharged. With the rotation of the hexagonal partition member 3, the volume of the exhaust cavities 16 in communication with the exhaust holes 1 decreases, and the air in the exhaust cavities 16 is continuously expelled.

When the hexagonal partition member 3 rotates by 120°, the blade tips of the hexagonal partition member 3 abut against the other ends of the separation baffles 14 and the separation baffles 14 are completely received into the accommodation grooves 4, the air drawn into the air intake cavities 17 reaches the maximum capacity, and the air intake pipes 2 are in communication with the exhaust holes 1. When the hexagonal partition member 3 continues to rotate and goes across the other ends of the separation baffles 14, the separation baffles 14 come out of the accommodation grooves 4 by the elastic forces of the compression springs 13, the volume of the exhaust cavities 16 decreases and the air drawn from the lower self-priming cavity 24 is discharged into the atmosphere, while the volume of the air intake cavities 17 gradually increases and air is continuously drawn from the lower self-priming cavity 24. That is, an air intake and exhaust process is completed every time each partition plate of the hexagonal partition member 3 rotates by 120°. In other words, a self-priming process is completed for eighteen times while the six partition plates rotate by a circle.

In the early stage of the operation of the device, the lower surface of the lower check valve 23 is attached to the bottom of the lower self-priming chamber 11, the lower self-priming cavity is only filled with air, the connecting springs 9 are stretched, the rubber discs 19 on the upper portion of the lower self-priming cavity 24 are attached to each other, and the rubber discs 19 on the lower portion of the lower self-priming cavity 24 are separated. As the operation progresses, the air in the lower self-priming cavity 24 continuously decreases to cause the pressure to drop. Since the pressure in the inlet pipe 25 below the communicating pipe 12 is atmospheric pressure, the lower check valve 23 is gradually lifted due to the pressure difference, the pulling forces on the connecting springs 9 decrease, and the rubber discs 19 on the lower portion of the lower self-priming cavity 24 are gradually attached to each other. As the operation further progresses, the pressure in the lower self-priming cavity 24 and the inlet pipe 25 drops, the connecting springs 9 change from the stretched state to the compressed state, the rubber discs 19 on the upper portion of the lower self-priming cavity 24 are separated, and the rubber discs 19 on the lower portion of the lower self-priming cavity 24 are closely attached to each other.

In the middle stage of the operation of the device, due to the increase of water in the inlet pipe 25, the lower self-priming cavity 24 is filled with a mixture of air and water, so that a large quantity of the gas-liquid two-phase flow is drawn into the upper self-priming cavity 5 via the air intake pipes 2 and is delivered into the atmosphere via the exhaust holes 1. Since the first-stage blades 10 are arranged on the bottom and the side surface of the lower check valve 23, the high-speed gas-liquid two-phase flow passes through the first-stage blades 10 and experiences gas-liquid cutting under the action of a centrifugal force, thereby completing preliminary gas-liquid separation. After the gas-liquid cutting, the liquid falls into the lower self-priming chamber 11 by gravity, while the gas flows upward and collides to cause gas-liquid separation when passing through intersections of the axes of the first-stage blades 10. The gas-liquid two-phase flow discharged from above the lower check valve 23 reaches the bottom of the upper check valve 20 and is under the centrifugal effect caused by rotation of the second-stage blades 21. Meanwhile, a part of the gas-liquid two-phase flow is cut by the connecting springs 9. Since the second-stage blades 21 on the left and right sides rotate in opposite directions, the effect of gas-liquid separation is enhanced, and second-stage gas-liquid separation is carried out. The separated liquid falls back by gravity and returns to the lower self-priming cavity 24 via the return holes 22. The gas-liquid two-phase flow entering the upper check valve 20 is cut by the spiral cutting blades when passing through the first-stage spiral separators 8, resulting in gas-liquid separation. The two-phase flows rotating in opposite directions collide at intersections of the first-stage spiral separators 8 and the second-stage spiral separator 7, resulting in further gas-liquid separation. The separated two-phase flow moves upward and passes through the second-stage spiral separator 7 to experience gas-liquid separation again. The gas-liquid two-phase flow passes through the upper check valve 20 and completes third-stage gas-liquid separation. The liquid-phase content in the two-phase flow discharged from above the upper check valve 20 is extremely low. The two-phase flow continues to move upward and passes through the third-stage blade 6 to complete final gas-liquid separation. The four times of gas-liquid separation reduces the liquid-phase displacement in the air intake process and accelerates air discharge from the device.

In the final stage of the operation of the device, the gas content in the lower self-priming cavity 24 is extremely low, and a large amount of liquid water is sucked out of the communicating pipe 12. The high-speed water flow jets out towards the bottom of the lower check valve 23, the pressure on the connecting springs 9 increases, and the rubber discs on the lower portion of the lower self-priming cavity 24 are deformed by compression to produce a downward force. When the water level in the lower self-priming cavity 24 exceeds the top of the lower check valve 23, the vertical downward force on the lower check valve 23 is greater than the vertical upward force, the lower check valve 23 falls back, and the lower surface of the lower check valve 23 is attached to the bottom of the lower self-priming chamber 11 to block the communicating pipe 12. The hexagonal partition member 3 stops rotation, the device stops working, and the centrifugal pump starts running. The damage caused by water hammer when the device is shut down can be effectively reduced, and the device is filled with liquid, so that the device can directly enter a normal operating condition when it is restarted, which significantly improves the working efficiency.

The above descriptions are preferred embodiments of the present invention, and are not intended to limit the present invention. Any obvious improvements, replacements, or modifications made by persons skilled in the art without departing from the essence of the present invention shall fall within the protection scope of the present invention.

What is claimed is:

1. A quick startup device for a centrifugal pump, comprising an upper self-priming chamber, a lower self-priming chamber, and an inlet pipe sequentially arranged from top to bottom, wherein the upper self-priming chamber, the lower self-priming chamber, and the inlet pipe are hollow cylindrical; the upper self-priming chamber and the lower self-priming chamber are mounted on the inlet pipe, an upper self-priming cavity is arranged in the upper self-priming chamber, a lower self-priming cavity is arranged in the lower self-priming chamber, and the lower self-priming chamber is connected to the inlet pipe via a communicating pipe;

a main shaft and a hexagonal partition member rotatably mounted on the main shaft are arranged on an axis of the upper self-priming chamber, and the main shaft is driven by a motor; the hexagonal partition member is regular hexagonal and comprises six identical partition plates, every two of the partition plates form an angle of 60°, the partition plates respectively have blade tips, the blade tip of each of the partition plates has a circular cross-section, every two of the blade tips are connected by a circular arc to achieve a smooth transition, and the blade tip of each of the partition plates is closely attached to an inner wall surface of the upper self-priming chamber;

three identical accommodation grooves are provided on an inner side of the upper self-priming chamber, and the accommodation grooves are arranged in tangential directions of the upper self-priming chamber; the accommodation grooves are embedded in the upper self-priming chamber and are in communication with the upper self-priming cavity; every two of the accommodation grooves form an angle of 120°;

a compression spring and a separation baffle are arranged in each of the accommodation grooves, wherein one end of the compression spring is connected to a bottom of the accommodation groove, an other end of the compression spring is connected to one end of the separation baffle, and an other end of the separation baffle abuts against an outer wall surface of the hexagonal partition member;

exhaust holes are provided on one of two sides of each of the accommodation grooves, and air intake pipes is are provided on an other of two sides of each of the accommodation grooves; the exhaust holes are arranged in radial directions of the upper self-priming chamber, the air intake pipes are arranged in the tangential directions of the upper self-priming chamber, the exhaust holes and the air intake pipes are uniformly distributed along a circumference of the upper self-priming chamber, the exhaust holes are in communication with an atmosphere, and the air intake pipes communicate the upper self-priming cavity with the lower self-priming cavity;

each exhaust hole and air intake pipe on the two sides of each of the accommodation grooves are located between two of the partition plates on the hexagonal partition member, respectively; the hexagonal partition member divides the upper self-priming cavity into six independent parts, and three parts of the six independent parts not adjacent to one another are divided by the separation baffle into two smaller portions, namely, an exhaust cavity and an air intake cavity; the exhaust cavity is in communication with the exhaust holes and the air intake cavity is in communication with the air intake pipes;

an upper check valve and a lower check valve are arranged in the lower self-priming chamber, and the upper check valve and the lower check valve are connected via connecting springs; a third-stage blade is arranged on top of the upper check valve; a rubber disc is arranged on an outer side of the upper check valve and return holes are provided on the rubber disc; two second-stage blades are arranged on a bottom of the upper check valve, each of first-stage spiral separators is arranged above one of the second-stage blades, and a second-stage spiral separator is arranged above the first-stage spiral separators; a rubber disc is arranged on an outer side of the lower check valve; and first-stage blades are arranged on a bottom and a side surface of the lower check valve.

2. The quick startup device for the centrifugal pump according to claim 1, wherein the other end of the separation baffle is semicircular; a ratio of a circle radius of each of the blade tips of the hexagonal partition member to a radius of curvature of the outer wall surface of the hexagonal partition member to a semicircle radius of the other end of the separation baffle is 3:9:1.

3. The quick startup device for the centrifugal pump according to claim 1, wherein the first-stage spiral separators and the second-stage spiral separator have identical structures;

each of the first-stage spiral separators comprises a semi-elliptical bend pipe and spiral cutting blades arranged on an inner surface of the semi-elliptical bend pipe, wherein the semi-elliptical bend pipe has a semi-elliptical structure with a ratio of a major axis to a minor axis being 4:3, and the spiral cutting blades on left and right sides of the first-stage spiral separator rotate in opposite directions.

4. The quick startup device for the centrifugal pump according to claim 1, wherein the two second-stage blades rotate in opposite directions;

the first-stage blades on the bottom of the lower check valve and the first-stage blades on the side surface of the lower check valve rotate in opposite directions, and the first-stage blades on the bottom of the lower check valve and the first-stage blades on the side surface of the lower check valve form an axial angle of 45°.

5. The quick startup device for the centrifugal pump according to claim 1, wherein the lower check valve has a circular cross-section;

a bottom surface of the lower check valve is closely attached to an inner wall of a bottom side of the lower self-priming chamber to block the communicating pipe.

6. The quick startup device for the centrifugal pump according to claim 1, wherein a bottom surface and the side surface of the lower check valve form an angle of 120°.

7. The quick startup device for the centrifugal pump according to claim 1, wherein the side surface of the lower check valve and a side surface at a bottom of the lower self-priming chamber are in clearance fit.

8. The quick startup device for the centrifugal pump according to claim 1, wherein a ratio of a depth of the accommodation groove to a height of the separation baffle is 1.2:1.

9. The quick startup device for the centrifugal pump according to claim 1, wherein a ratio of a diameter of the inner wall of the upper self-priming chamber to a diameter of an inner wall of the lower self-priming chamber is 2:3.

10. The quick startup device for the centrifugal pump according to claim 1, wherein the first-stage spiral separators, the second-stage spiral separator, the first-stage blades, the third-stage blade, and the second-stage blades are made of aluminum alloy materials;

the upper self-priming chamber, the lower self-priming chamber, the inlet pipe, the air intake pipes, and the accommodation grooves are integrally formed by cast iron;

the hexagonal partition member, the separation baffles, the upper check valve, and the lower check valve are formed by rubber materials;

the compression springs are made of graphene materials.

* * * * *